United States Patent
Katayama

(10) Patent No.: US 7,665,042 B2
(45) Date of Patent: Feb. 16, 2010

(54) INPUT APPARATUS AND METHOD FOR INPUTTING INFORMATION WITH A SMALL DISPLAY AREA

(75) Inventor: Shinichi Katayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 540 days.

(21) Appl. No.: 10/369,581

(22) Filed: Feb. 21, 2003

(65) Prior Publication Data

US 2004/0012571 A1    Jan. 22, 2004

(30) Foreign Application Priority Data

Jul. 3, 2002     (JP)  .............................. 2002-194504

(51) Int. Cl.
*G06F 3/033* (2006.01)
(52) U.S. Cl. ...................... 715/863; 715/864
(58) Field of Classification Search ................ 715/863, 715/780, 864, 703, 767, 810, 831, 535, 541, 715/830; 345/179, 173
See application file for complete search history.

(56) References Cited

U.S. PATENT DOCUMENTS

| | | | | |
|---|---|---|---|---|
| 5,471,578 A | * | 11/1995 | Moran et al. | 715/863 |
| 5,523,775 A | * | 6/1996 | Capps | 345/179 |
| 5,677,708 A | * | 10/1997 | Matthews et al. | 345/684 |
| 5,832,113 A | * | 11/1998 | Sano | 345/173 X |
| 6,094,197 A | * | 7/2000 | Buxton et al. | 715/863 |
| 6,271,835 B1 | * | 8/2001 | Hoeksma | 345/179 X |
| 6,388,686 B1 | * | 5/2002 | Hetherington et al. | 715/810 |
| 6,535,204 B2 | * | 3/2003 | Sun | 345/173 |
| 6,683,600 B1 | * | 1/2004 | Lui | 345/179 |
| 6,956,562 B1 | * | 10/2005 | O'Hara et al. | 345/173 |
| 2007/0011623 A1 | * | 1/2007 | Billmaier et al. | 715/830 X |

FOREIGN PATENT DOCUMENTS

| | | |
|---|---|---|
| JP | 5-108244 | 4/1993 |
| JP | 8-235317 | 9/1996 |
| JP | 8-272787 | 10/1996 |

OTHER PUBLICATIONS

Using Gestures to Select from Menus in Pen Input, IBM Technical Disclosure Bulletin, vol. 37, No. 11, Nov. 1, 1994, pp. 437-438.*

* cited by examiner

*Primary Examiner*—Boris Pesin
(74) *Attorney, Agent, or Firm*—Staas & Halsey LLP

(57) ABSTRACT

An input apparatus enables a user to input information selected by the user as the user intends by using a comparatively small input surface area. The input apparatus comprises an indicating position detecting part detecting an indicating position, a candidate input information replacing part replacing a candidate of the input information based on a shift of the indicating position, and an input information determining part determining the input information from the candidate of the input information.

12 Claims, 14 Drawing Sheets

FIG.6

| あ | か | さ | た | な | は | ま | や | ら | わ |
|---|---|---|---|---|---|---|---|---|---|
| い | き | し | ち | に | ひ | み |  | り |  |
| う | く | す | つ | ぬ | ふ | む | ゆ | る | を |
| え | け | せ | て | ね | へ | め |  | れ |  |
| お | こ | そ | と | の | ほ | も | よ | ろ | ん |

25 (pointing to す)

FIG.12

| ア | カ | サ | タ | ナ | ハ | マ | ヤ | ラ | ワ |
|---|---|---|---|---|---|---|---|---|---|
| イ | キ | シ | チ | ニ | ヒ | ミ |   | リ |   |
| ウ | ク | ス | ツ | ヌ | フ | ム | ユ | ル | ヲ |
| エ | ケ | セ | テ | ネ | ヘ | メ |   | レ |   |
| オ | コ | ソ | ト | ノ | ホ | モ | ヨ | ロ | ン |

27

INPUT APPARATUS AND METHOD FOR INPUTTING INFORMATION WITH A SMALL DISPLAY AREA

CROSS REFERENCE TO RELATED APPLICATION

The present application is based on Japanese priority application No. 2002-194504 filed Jul. 3, 2002, the entire contents of which are hereby incorporated by reference.

BACKGROUND OF THE INVENTION

1. Field of the Invention

The present invention generally relates to input apparatuses, input methods and input programs for inputting information, and more particularly to an input apparatus, an input method and an input program for inputting character information and application information.

2. Description of the Related Art

Regarding an input apparatus for a computer, there is a type of input apparatus that enables a user to input information such as a character by writing the information on a touch panel of such a computer by means of a pen and the like. Also, another type of input apparatus enables a user to input a character by touching or clicking the character on a keyboard projected on the screen of such a computer.

However, when a user uses these types of computers to input information, that is, when the user inputs a character on such a touch panel or such a keyboard, it is necessary to prepare a reasonably wide area for the touch panel or the keyboard so that the user can conveniently input the character on the touch panel or properly recognize characters on the keyboard. Also, when a user manually writes a character on such a touch panel of an input apparatus, the input apparatus is likely to recognize the written character differently from the user's intended character depending on the user's handwriting of the written character.

SUMMARY OF THE INVENTION

It is a general object of the present invention to provide an input apparatus, an input method and an input program in which the above-mentioned problems are eliminated.

A more specific object of the present invention is to provide an input apparatus, an input method and an input program that allow a user to input information by using a comparatively small area.

Additionally, another more specific object of the present invention is to provide an input apparatus, an input method and an input program wherein a user can properly input information as the user intends.

In order to achieve the above-mentioned objects, there is provided according to one aspect of the present invention an input apparatus for inputting input information selected by a user, comprising: an indicating position detecting part detecting an indicating position; a candidate input information replacing part replacing a candidate of the input information based on a shift of the indicating position; and an input information determining part determining the input information from the candidate of the input information.

According to the above-mentioned invention, the user can select input information by moving the indicating position. As a result it is possible to provide an input apparatus that enables the user to input the input information as the user intends by using a comparatively small area.

In the above-mentioned input apparatus, the candidate input information replacing part may replace the candidate of the input information when the indicating position is shifted along a rough circle.

According to the above-mentioned invention, it is possible to provide an input apparatus that enables the user to input the input information by simply shifting the indicating position along a rough circle.

In the above-mentioned input apparatus, the input information may be character information.

According to the above-mentioned input apparatus, it is possible to provide an input apparatus that allows the user to input character information.

In the above-mentioned input apparatus, the input information may be application information for starting an application.

According to the above-mentioned input apparatus, it is possible to provide an input apparatus that enables the user to input the start of an application.

Additionally, there is provided according to another aspect of the present invention an input method for implementing an input apparatus for inputting input information selected by a user, the input method comprising: an indicating position detecting step of detecting an indicating position; a candidate input information replacing step of replacing a candidate of the input information based on a shift of the indicating position; and an input information determining step of determining the input information from the candidate of the input information.

Additionally, there is provided according to another aspect of the present invention an input program for causing a computer to execute: an indicating position detecting step of detecting an indicating position; a candidate input information replacing step of replacing a candidate of the input information based on a shift of the indicating position; and an input information determining step of determining the input information from the candidate of the input information.

Additionally, there is provided according to another aspect of the present invention a computer readable recording medium for recording an input program for causing a computer to execute: an indicating position detecting step of detecting an indicating position; a candidate input information replacing step of replacing a candidate of the input information based on a shift of the indicating position; and an input information determining step of determining the input information from the candidate of the input information.

According to the above-mentioned inventions, the user can select input information by moving the indicating position. As a result, the user can input the input information as the user intends by using a comparatively small area.

Other objects, features and advantages of the present invention will become more apparent from the following detailed description when read in conjunction with the accompanying drawings.

BRIEF DESCRIPTION OF THE DRAWINGS

FIG. 6 is a diagram illustrating a Hiragana character table;

FIG. 12 is a diagram illustrating a Katakana character table;

DETAILED DESCRIPTION OF THE PREFERRED EMBODIMENTS

In the following, an embodiment of the present invention will be described with reference to the accompanying drawings.

Figure 1:
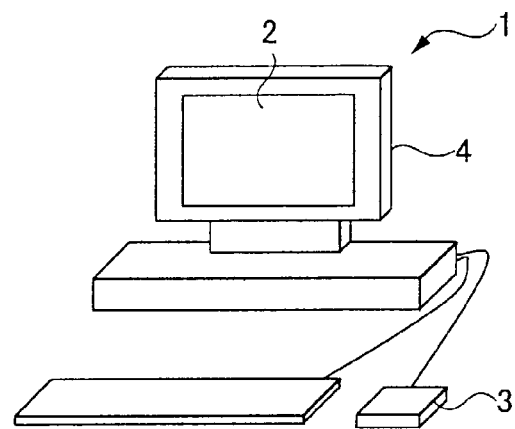
FIG. 1 is a diagram illustrating an overall structure of a system including input apparatuses according to an embodiment of the present invention.

FIG. 1 shows an overall structure of a system including an input apparatus according to the embodiment of the present invention. As is shown in FIG. 1, the system has two types of input apparatuses; an input apparatus 2 mounted on a display apparatus 4 of a computer 1 and an input apparatus 3 provided exterior to the computer 1. These input apparatuses 2 and 3 are connected to the computer 1 via USB (Universal Serial Bus) cables and the like. The input apparatuses 2 and 3 provide the computer 1 with data such as a detected touch position so that the computer 1 can display the touch position. Here, the data may be sent in either a serial fashion or a parallel fashion.

Figure 2:
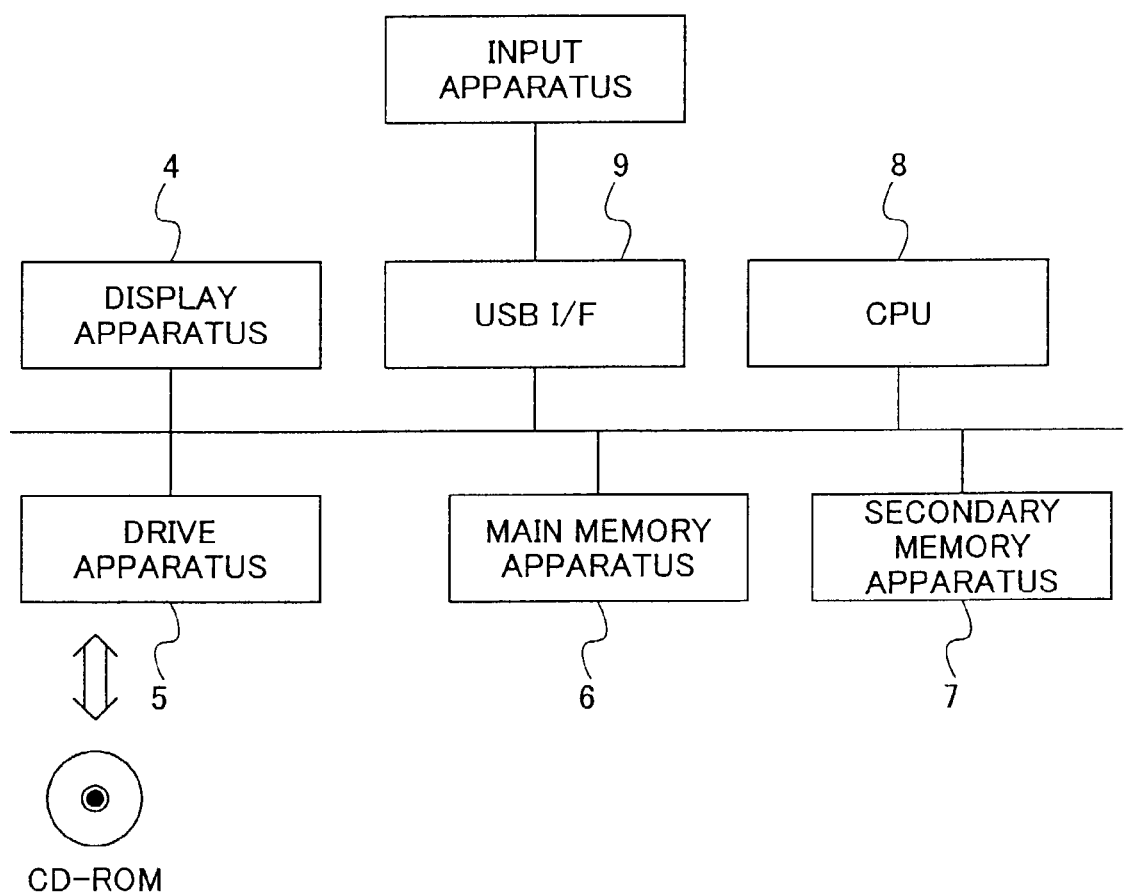
FIG. 2 is a block diagram illustrating a hardware configuration of a computer according to the embodiment.

FIG. 2 shows a block diagram of the hardware configuration of the computer 1. As is shown in FIG. 2, the computer 1 comprises the display apparatus 4, a drive apparatus 5, a main memory apparatus 6, a secondary memory apparatus 7, a CPU (Central Processing Unit) 8, and a USB interface 9. Also, these parts are connected to each other via a bus. The display apparatus 4 displays various information items so that a user can operate the computer 1. The drive apparatus 5 serves to read/write data from/to a detachable recording medium such as a CD-ROM. For instance, the drive apparatus 5 is used to read a program from a CD-ROM and then install the program in the secondary memory apparatus 7. The CPU 8 reads a program from the secondary memory apparatus 7 and then executes the program. The CPU 8 uses the main memory apparatus 6 to temporarily store such a program and data during execution by the CPU 8. The USB interface 9 serves to communicate data between the computer 1 and the input apparatus 3 in accordance with USB transmission protocol.

A description will now be given of the input apparatuses 2 and 3.

The input apparatus 2 is formed of a touch panel having a sensor part for detecting a touch of a stylus pen, a finger, or a pen to the touch panel. The input apparatus 2 is fixed to the surface of the display apparatus 4.

Figure 3:
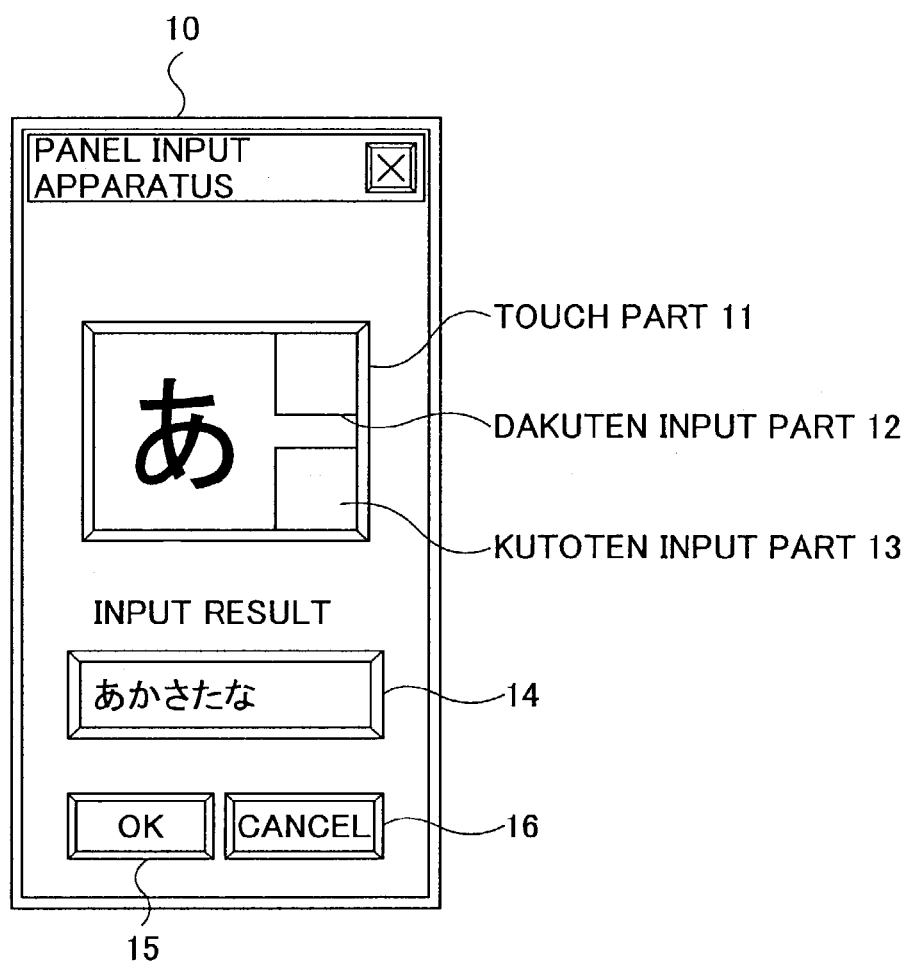
FIG. 3 is a diagram illustrating a graphic displayed on the input apparatus according to the embodiment.

FIG. 3 shows a graphic 10 displayed on the display apparatus 4. The graphic 10 has a touch part 11 formed of a dakuten input part 12, a kutoten input part 13, and a display part of the Japanese Hiragana character "あ". Here, a "dakuten" is attached to certain Japanese Hiragana characters and works as a spoken sound mark, and a "kutoten" means a Japanese punctuation symbol. A user can input a character in the input apparatus 2 by touching the touch part 11 with a pen or a finger. The user touches the dakuten input part 12 in order to attach a dakuten to a displayed character. Also, the user touches the kutoten input part 13 in order to place a kutoten at the next position of the displayed character.

Furthermore, the graphic 10 has an input result display box 14 for displaying an input result, an OK button 15, and a cancel button 16 together with the touch part 11.

Figure 4:
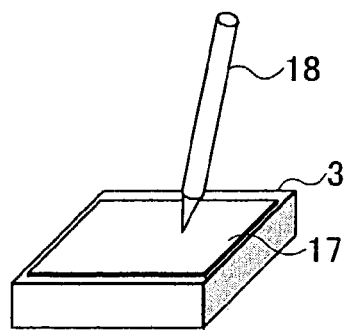
FIG. 4 is a perspective view of the input apparatus according to the embodiment.

FIG. 4 shows a perspective view of the input apparatus 3. As is shown in FIG. 4, the input apparatus 3 has a sensor part 17 for detecting a touch of a stylus pen, a finger, or a pen 18 thereto and the touch point thereof. The input apparatus 3 may display input information on the display apparatus 4 like the input apparatus 2 or on the input apparatus 3 itself.

Figure 5:
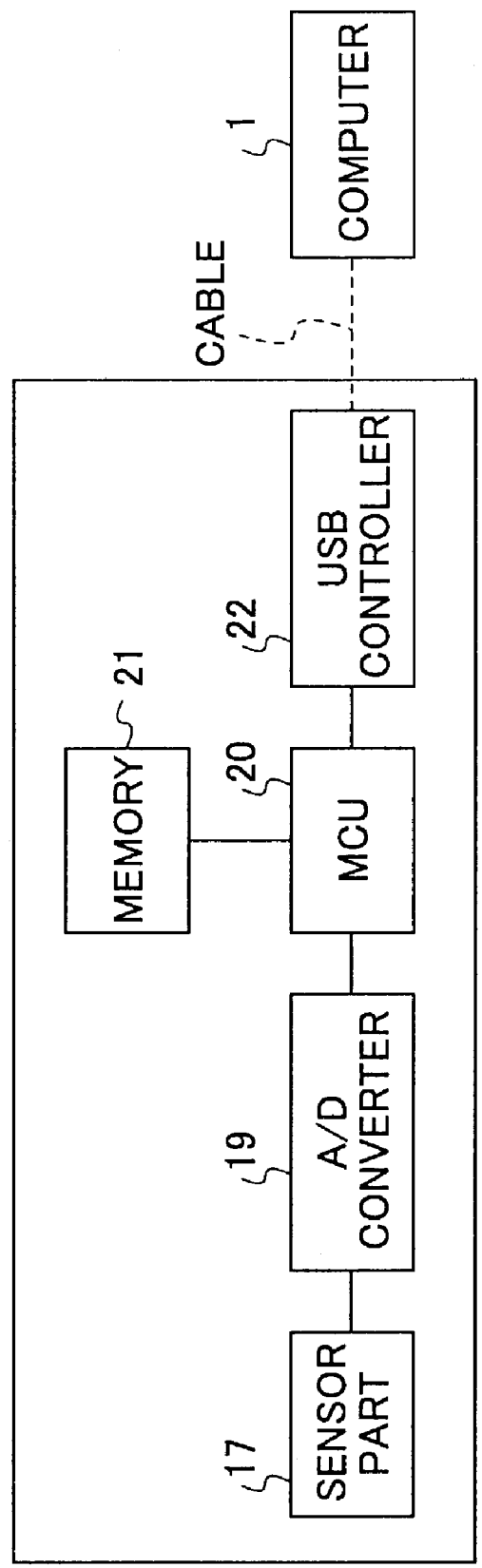
FIG. 5 is a block diagram illustrating a hardware configuration of the input apparatus according to the embodiment.

FIG. 5 shows a hardware configuration of an input apparatus according to the embodiment. Particularly, FIG. 5 shows the input apparatus 3. However, the input apparatus 2 is also formed of a similar hardware configuration to that of the input apparatus 3 shown in FIG. 5. As is shown in FIG. 5, the input apparatus 3 has the above-mentioned sensor part 17, an A/D converter 19, an MCU (Micro Computer Unit) 20, a memory 21, and a USB controller 22. The sensor part 17 detects a touch thereto and the touch position thereof as mentioned above. The detected signal is supplied to the A/D converter 19, and the converted signal is supplied to the MCU 20. The MCU 20 processes the supplied data signal and provides the processed data to the computer 1 via the USB controller 22. The memory 21 is used to temporarily store a program for processing the data and data to be processed.

A description will now be given of a definition of a "touch" to the sensor part 17. When a user continues touching the sensor part 17 over a predetermined time period, it is considered that the sensor part 17 is touched. Accordingly, even if the user accidentally makes momentary contact with the sensor part 17, it is determined that there is no touch to the sensor part 17.

On the other hand, the user stops touching the sensor part 17, for instance, by releasing a pen touched thereto from the sensor part 17. Then, if the touch to the sensor part 17 has not been detected over a predetermined time period, it is determined that the user has stopped touching the sensor part 17. In this case, the most recently detected coordinate during the touch condition is considered as the detection point of the touch operation.

A description will now be given of a click operation and a double-click operation on the sensor part 17. It is supposed that a touch to the sensor part 17 is detected. Then, if the touch is released within a predetermined time period and the release condition continues over a predetermined time period, it is considered that the user has clicked on the sensor part 17. Furthermore, if the above release condition does not continue over the predetermined time period and another touch is detected within the predetermined time period, this operation (first touch) is registered as the first click of the double click. Furthermore, if a similar operation to the first click is detected after the registration of the first click, the operation (second touch) is considered as the second click of the double click. As mentioned above, the double click is detected.

A description will now be given of a drag operation. In the drag operation, a user moves a pen as the user's pen touches the sensor part 17. If the above second touch is detected after the registration of the above first click of the double click operation and then the second touch continues over (in excess of) the predetermined time period, the operation is considered as the drag operation.

As mentioned above, as long as the touch condition and the release condition do not persist over a predetermined time period, it is not determined that the user performs the touch and the release operations, respectively. In other words, if these conditions persist for less than the predetermined time period, it is determined that the current condition has not been changed. Of course, it is possible to consider just a touch and a release as the touch operation and the release operation. However, the above definitions of the touch and the release operations are often useful in practice.

A description will now be given of how a user inputs information through the input apparatuses 2 and 3. Here, although the input apparatus 3 and a pen are used in the following description, the user can input the information through the input apparatus 2 like the input apparatus 3. Additionally, the description handles the case where the user inputs a Japanese Hiragana character displayed on the display apparatus 4.

A Hiragana character table 24 shown in FIG. 6 is described. As is shown in FIG. 6, 50 Hiragana characters are arranged according to the syllabary as shown in the character table 24. Only the Hiragana character surrounded by a scope 25 is displayed on the display apparatus 4. In this example, the Hiragana character "す" surrounded by the scope 25 is displayed on the display apparatus 4.

In order to input the desired character, a user operates the scope 25 through the input apparatus 3. It is noted that the operation of moving the scope 25 is equivalent to that of moving the Hiragana character table 24 in this case. Thus, the user may fix the scope 25 and operate the character table 24 instead of shifting the fixed scope 25.

The scope 25 can be moved in the vertical and horizontal directions. A description will now be given, with reference to FIGS. 7 through 10, of the operation method for moving the scope 25 in the two directions.

Figure 7:
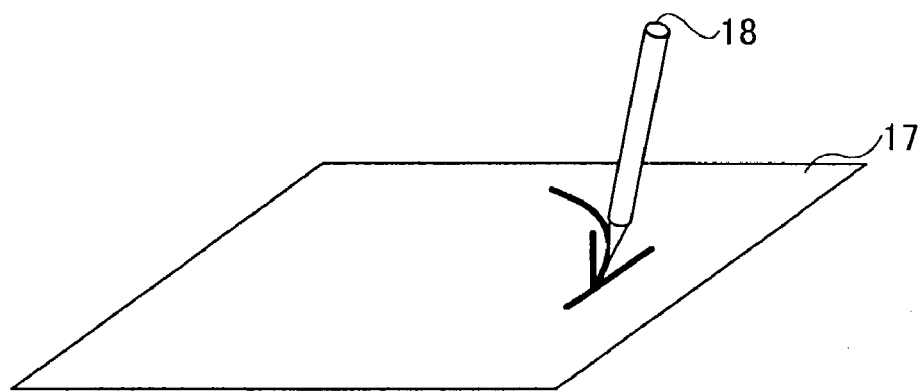
FIG. 7 is a diagram illustrating a case where an arc is drawn clockwise.
Figure 8:
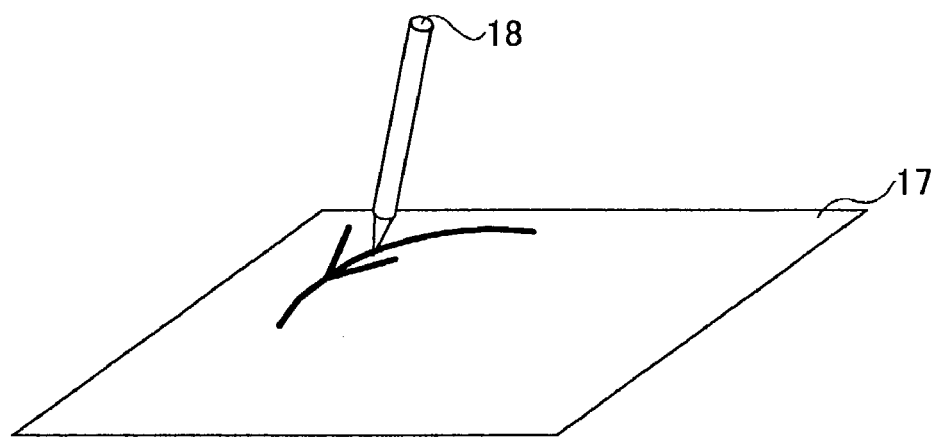
FIG. 8 is a diagram illustrating a case where an arc is drawn counterclockwise.
Figure 9:
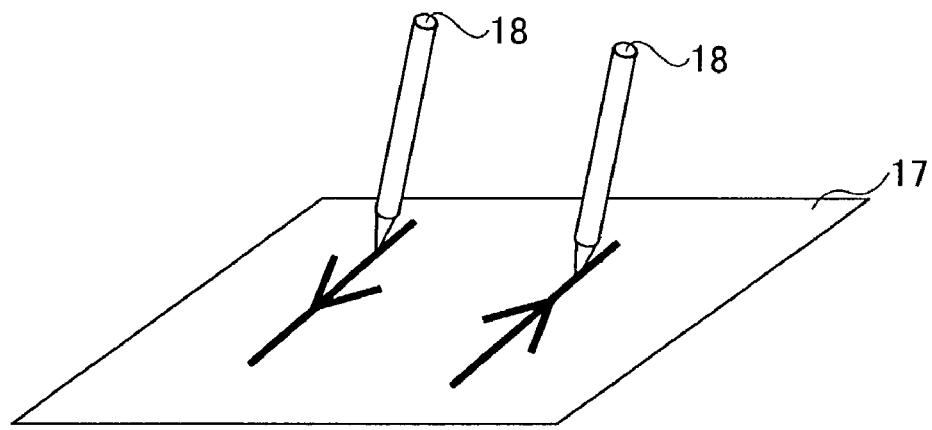
FIG. 9 is a diagram illustrating a case where a straight line is drawn.
Figure 10:
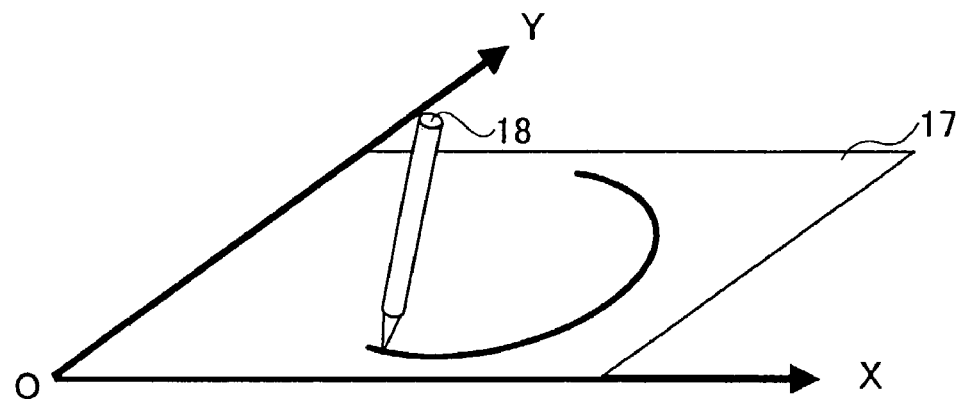
FIG. 10 is a diagram illustrating a case where a figure is drawn on a plane in which an X-Y coordinate system is set.

There are two fundamental operations. One is an arc drawing operation for drawing an arc on the sensor part 17 by means of the pen 18, and the other is a line drawing operation for drawing a straight line on the sensor part 17 by means of the pen 18. FIGS. 7 and 8 handle the arc drawing operation. In FIGS. 7 and 8, an arc is drawn clockwise and counterclockwise, respectively, on the sensor part 17 by means of the pen 18. On the other hand, FIG. 9 handles the case where a straight line is drawn on the sensor part 17 by means of the pen 18.

The drawn arc and the drawn straight line are loci of the touch points of the pen 18 to the sensor part 17. From this viewpoint, it is convenient that the sensor part 17 is considered as a plane in which an X-Y coordinate system is set. The arc and the straight line are considered as loci in this X-Y coordinate plane illustrated in FIG. 10.

Figure 11:
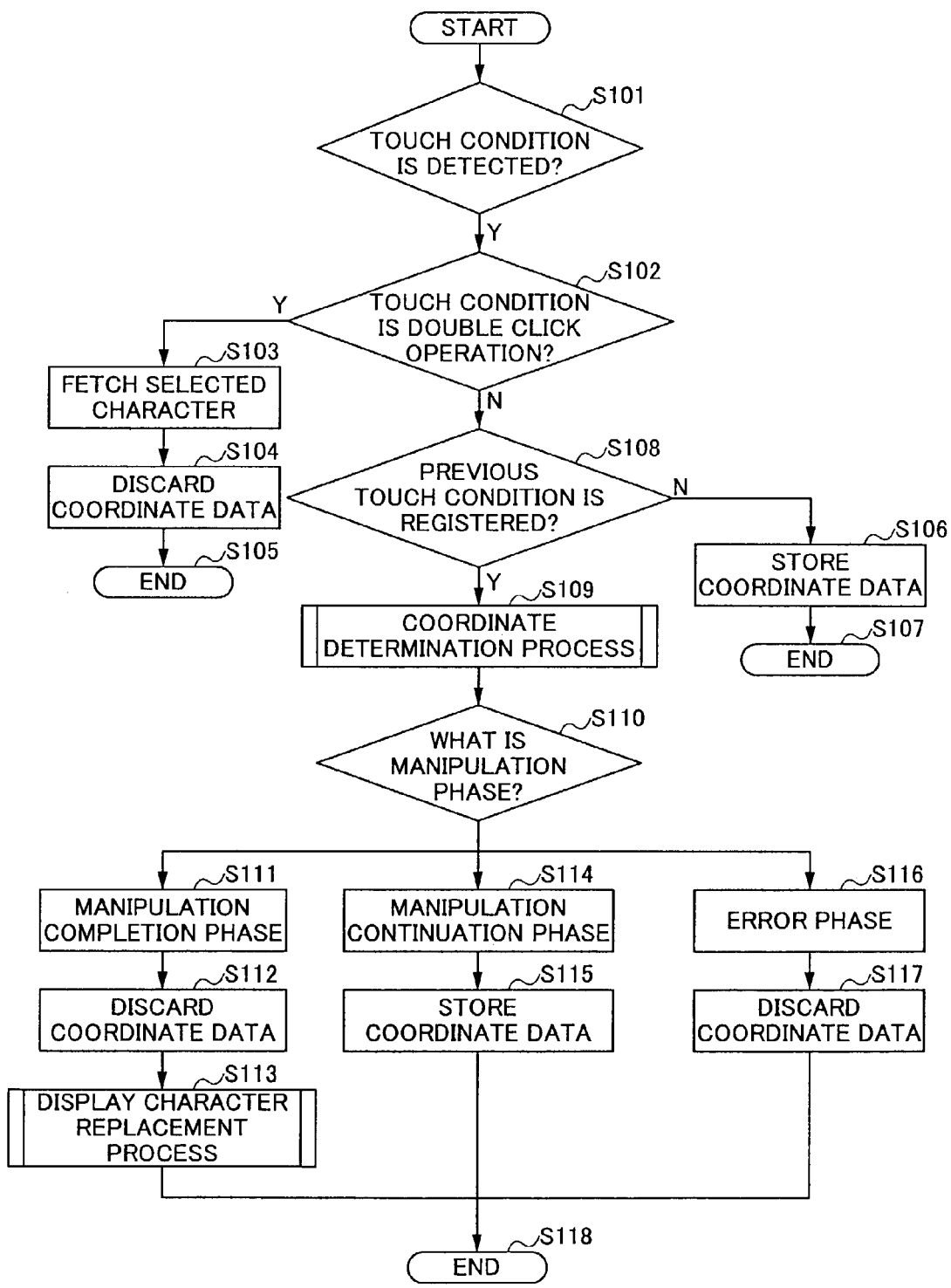
FIG. 11 is a flowchart of a procedure for determining what operation a user intends based on a locus drawn by the user according to the embodiment.

FIG. 11 is a flowchart of a procedure for determining what operation a user performs based on such a locus. Here, the computer 1 may undertake the procedure, or the input apparatus 2 or 3 may carry out the procedure and then supply a result of the procedure to the computer 1. The following description handles the former case, that is, the case where the computer 1 undertakes the procedure. Here, even if either the computer 1 or the input apparatuses 2 and 3 undertake the procedure, the touch condition and the detection point are detected and then the detection point is converted into a logic-based coordinate point available to the OS (Operating System) mounted in the computer 1.

At step S101 of the flowchart in FIG. 11, it is supposed that the computer 1 detects the touch condition based on a touch to the sensor part 17. At step S102, the computer 1 determines whether or not the touch condition pertains to the double click operation. If the touch condition is determined as the double click, the computer 1 fetches the character surrounded by the scope 25 as an input character to the input apparatus 3 at step S103. At step S104, the computer 1 discards the maintained coordinate data, and then terminates the procedure at step S105.

If the touch condition is not determined as the double click at step S102, the computer 1 proceeds to step S108. At step S108, the computer 1 determines whether or not a previous touch condition is registered in the computer 1. If the computer 1 has no previous touch condition, the computer 1 stores the coordinate data of the current touch condition because this touch operation is the first touch. Then, the computer 1 terminates the procedure at step S107.

If it is determined that a previous touch condition is registered in the computer 1, the computer 1 proceeds to a coordinate determination process at step S109. In this coordinate determination process, the computer 1 obtains moving direction information or character type replacement information which will be mentioned later. Additionally, the computer 1 obtains information items regarding the user's current manipulation phase: a manipulation completion phase, a manipulation continuation phase and an error phase. The coordinate determination process will be described in detail later.

Based upon the manipulation phase obtained at step S109, the computer 1 selects the next process at step S110. If the computer 1 obtains the manipulation completion phase indicating that the user's input manipulation is completed at the current phase, the computer 1 proceeds from step S111 to step S112. At step S112, the computer 1 discards the stored coordinate data. Then, at step S113, the computer 1 replaces the displayed character based on the moving direction information or the character type replacement information obtained at step S109. If the computer 1 obtains the moving direction information, the computer 1 moves the scope 25 in the moving direction indicating where the touch point of the user is headed. If the computer 1 obtains the character type replacement information, the computer 1 replaces the character type, for instance, replaces the current Hiragana character table 24 shown in FIG. 6 with a Katakana character table 26 shown in FIG. 12. Then, the computer 1 terminates the procedure at step S118. Here, the displayed character table is not limited to Japanese Hiragana characters and Katanaka characters. An alphabet character table may be also displayed. Also, some figures such as icons of application programs may be displayed. In this case, when the user selects a displayed icon, the computer 1 starts the corresponding application program.

If the computer 1 obtains the manipulation continuation phase at step S109, the computer 1 proceeds from step S114 to step S115. Since the user is currently manipulating the input apparatus 3, the computer 1 stores the current coordinate data and then terminates the procedure at step S118.

If the computer 1 obtains the error phase at step S109, the computer 1 proceeds from step S116 to step S117. Since it is considered that some errors occur with respect to the input manipulation, the computer 1 discards the current coordinate data and then terminates the procedure at step S118.

A description will now be given, with reference to a flowchart in FIG. 13, of the coordinate determination process at step S109.

At step S201, the computer 1 compares the current coordinates to the previous coordinates pertaining to the last touch point. The computer 1 computes two differences XA and YA between the current coordinates and the previous coordinates. The difference XA is the difference with respect to the X axis of the sensor part 17, and the difference YA is the difference with respect to the Y axis of the sensor part 17. In fact, the two values XA and YA are solved in the following formulae;

$XA$=(the current $X$ coordinate)−(the previous $X$ coordinate), and $YA$=(the current $Y$ coordinate)−(the previous $Y$ coordinate).

Based upon the differences XA and YA, for instance, if XA is positive, the computer 1 can conclude that the current coordinates have moved from the previous coordinates in the X direction. To the contrary, if XA is negative, the computer 1 can conclude that the current coordinates have moved from the previous coordinates toward the original point of the coordinate system of the sensor part 17.

Based upon the values of the differences XA and YA, the computer 1 selects the next process among 8 processes corresponding to 8 cases with respect to supposed pairs of positive and negative values of XA and YA. In the following, these processes will be described. In order to simplify the description, if the current point moves from the previous point in the direction toward the original point with respect to the X axis, the current point is said to move in the left direction. To the contrary, if the current point moves from the previous point in the direction away from the original point with respect to the X axis, the current point is said to move in the right direction. Also, if the current point moves from the previous point in the direction toward the original point with respect to the Y axis, the current point is said to move in the lower direction. To the contrary, if the current point moves from the previous point in the direction away from the original point with respect to the Y axis, the current point is said to move in the upper direction.

For instance, if the scope 25 is moved on the Hiragana character table shown in FIG. 6, the lower directional shift means that the displayed character is changed according to the order "あ", "い", "う", "え" and "お". To the contrary, the upper directional shift means that the displayed character is changed according to the reverse order "お", "え", "う", "い" and "あ". Also, the right directional shift of the scope 25 means that the displayed character is changed according to the order "あ", "か", "さ", "た", "な", . . . . To the contrary, the left directional shift means that the displayed character is changed according to the reverse order . . . , "な", "た", "さ", "か" and "あ".

Figure 14:
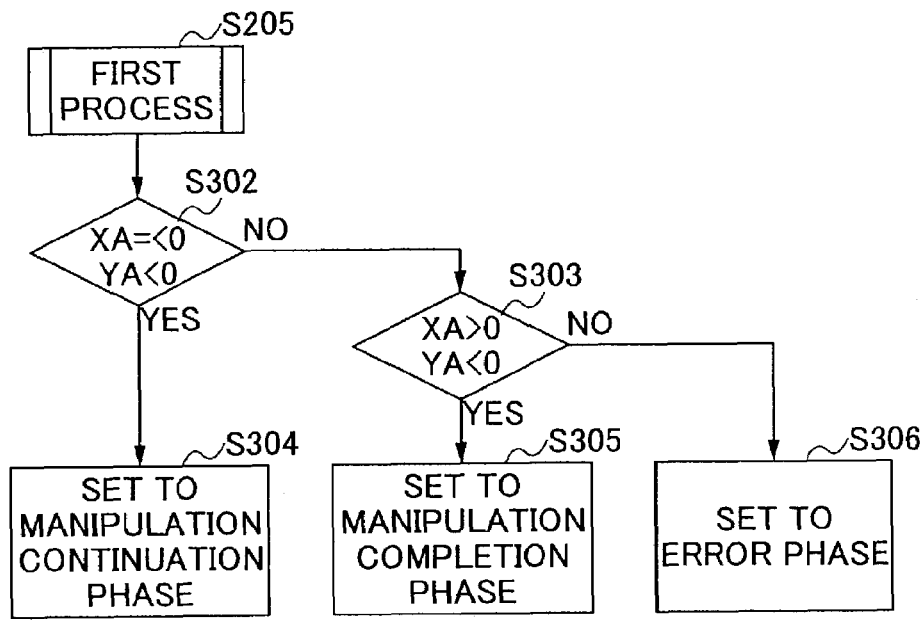
FIG. 14 is a flowchart of a first process in the flowchart shown in FIG. 13.

A description will now be given of step S203. Step S203 handles the first case where XA is less than or equal to 0 and YA is less than 0, that is, the current point moves in the lower direction and at least does not move in the right direction from the previous point. When the current point is shifting in such a way, for instance, the user is likely to move the scope 25 counterclockwise in the lower direction. At step S204, the computer 1 determines that the user intends to move the scope 25 in the lower direction. Then, the computer 1 proceeds from the step S205 to step S302 in FIG. 14 and then examines newly updated values XA and YA again. At step S302, if the computer 1 remains unchanged, that is, if the updated XA is less than or equal to 0 and the updated YA is less than 0, the computer 1 sets the manipulation phase to the manipulation continuation phase at step S304 and then terminates the procedure. If the computer 1 does not remain unchanged, the computer 1 proceeds to step S303 and determines whether or not the updated XA is more than 0 and the updated YA is less than 0. When this condition is satisfied, it is determined that the updated current point has moved in the lower-right direction. If the condition is satisfied at the step S303, the computer 1 proceeds to step S305 and then sets the manipulation phase to the manipulation completion phase. If the condition is not satisfied at the step S303, the computer 1 sets the manipulation phase to the error phase at step S306 and then terminates the procedure.

Figure 15:
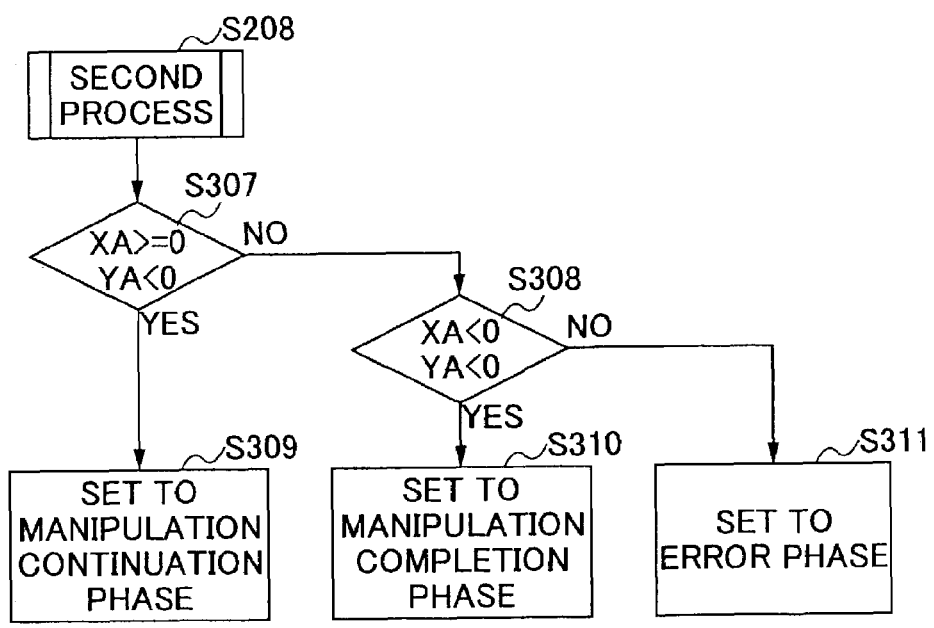
FIG. 15 is a flowchart of a second process in the flowchart shown in FIG. 13.

A description will now be given of step S206. Step S206 handles the second case where XA is more than or equal to 0 and YA is less than 0, that is, the current point moves in the lower direction and at least does not move in the left direction from the previous point. When the current point moves in such a way, for instance, the user is likely to move the scope 25 clockwise in the lower direction. At step S207, the computer 1 determines that the user intends to replace the displayed character type. Then, the computer 1 proceeds from the step S208 to step S307 in FIG. 15 and then examines newly updated values XA and YA again. At step S307, if the computer 1 remains unchanged, that is, if the updated XA is more than or equal to 0 and the updated YA is less than 0, the computer 1 sets the manipulation phase to the manipulation continuation phase at step S309 and then terminates the procedure. If the computer 1 does not remain unchanged, the computer 1 proceeds to step S308 and determines whether or not the updated XA is less than 0 and the updated YA is less than 0. When this condition is satisfied, it is determined that the updated current point has moved in the lower-left direction. If the condition is satisfied at the step S308, the computer 1 proceeds to step S310 and then sets the manipulation phase to the manipulation completion phase. If the condition is not satisfied at the step S308, the computer 1 sets the manipulation phase to the error phase at step S311 and then terminates the procedure.

Figure 16:
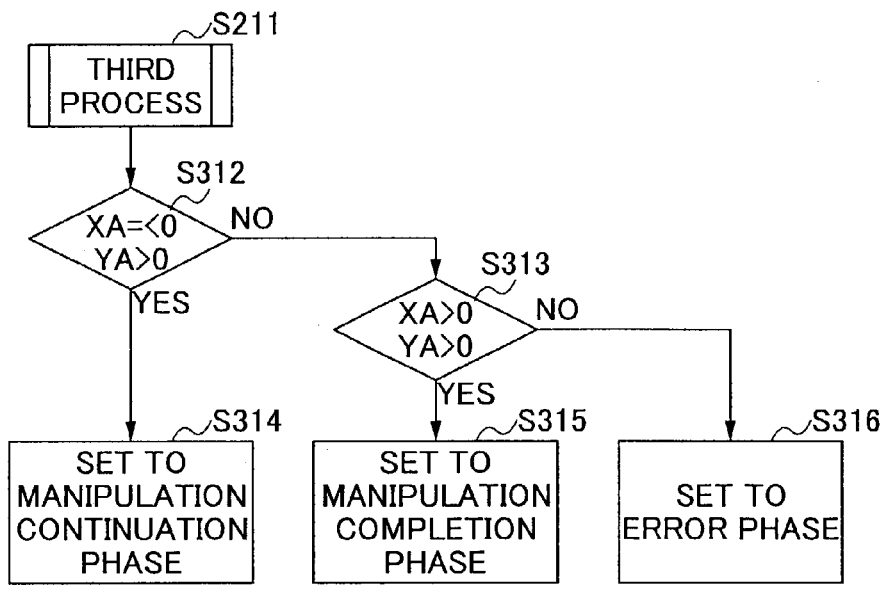
FIG. 16 is a flowchart of a third process in the flowchart shown in FIG. 13.

A description will now be given of step S209. Step S209 handles the third case where XA is less than or equal to 0 and YA is more than 0, that is, the current point moves in the upper direction and at least does not move in the right direction from the previous point. When the current point moves in such a way, for instance, the user is likely to move the scope 25 counterclockwise in the upper direction. At step S210, the computer 1 determines that the user intends to move the scope 25 in the upper direction. Then, the computer 1 proceeds from step S211 to step S312 in FIG. 16 and then examines newly updated values XA and YA again. At step S312, if the computer 1 remains unchanged, that is, if the updated XA is less than or equal to 0 and the updated YA is more than 0, the computer 1 sets the manipulation phase to the manipulation continuation phase at step S314 and then terminates the procedure. If the computer 1 does not remain unchanged, the computer 1 proceeds to step S313 and determines whether or not the updated XA is more than 0 and the updated YA is more than 0. When this condition is satisfied, it is determined that the updated current point has moved in the upper-right direction. If the condition is satisfied at step S313, the computer 1 proceeds to step S315 and then sets the manipulation phase to the manipulation completion phase. If the condition is not satisfied at step S313, the computer 1 sets the manipulation phase to the error phase at step S316 and then terminates the procedure.

Figure 17:
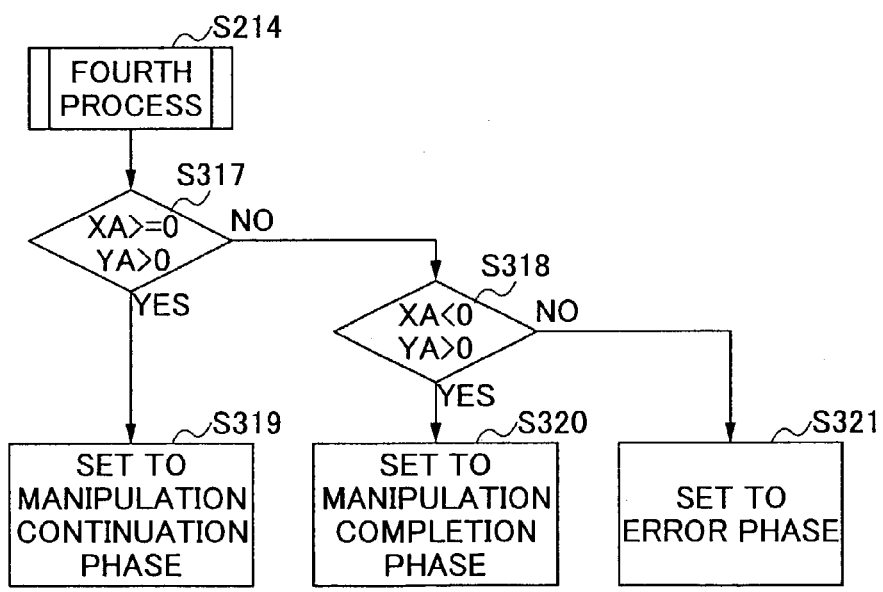
FIG. 17 is a flowchart of a fourth process in the flowchart shown in FIG. 13.

A description will now be given of step S212. Step S212 handles the fourth case where XA is more than or equal to 0 and YA is more than 0, that is, the current point moves in the upper direction and at least does not move in the left direction from the previous point. When the current point moves in such a way, for instance, the user is likely to move the scope 25 clockwise in the upper direction. At step S213, the computer 1 determines that the user intends to change the displayed character type. Then, the computer 1 proceeds from step S214 to step S317 in FIG. 17 and then examines newly updated values XA and YA again. At step S317, if the computer 1 remains unchanged, that is, if the updated XA is more than or equal to 0 and the updated YA is more than 0, the computer 1 sets the manipulation phase to the manipulation continuation phase at step S319 and then terminates the procedure. If the computer 1 does not remain unchanged, the computer 1 proceeds to step S318 and determines whether or not the updated XA is less than 0 and the updated YA is more than 0. When this condition is satisfied, it is determined that the updated current point has moved in the upper-left direction. If the condition is satisfied at step S318, the computer 1 proceeds to step S320 and then sets the manipulation phase to the manipulation completion phase. If the condition is not satisfied at step S318, the computer 1 sets the manipulation phase to the error phase at step S321 and then terminates the procedure.

Figure 18:
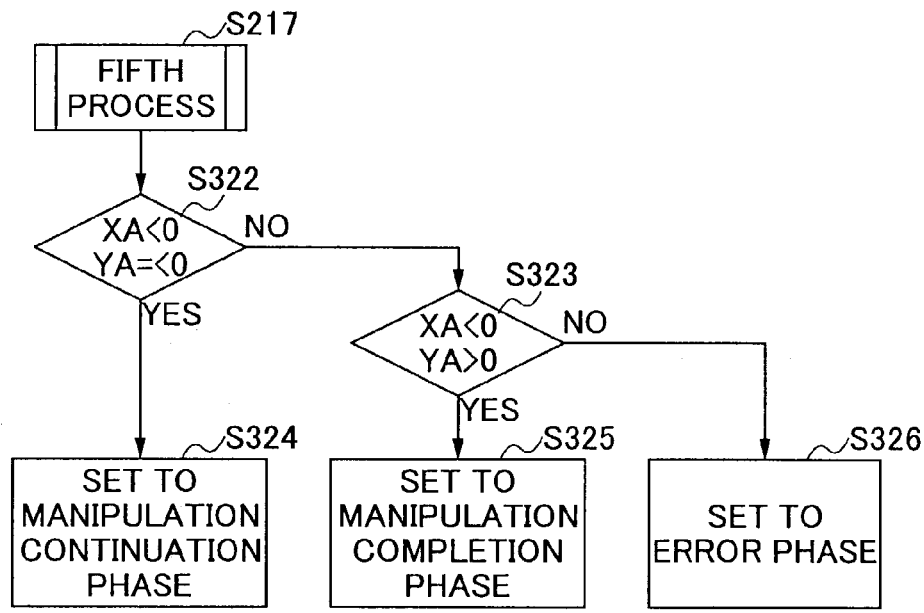
FIG. 18 is a flowchart of a fifth process in the flowchart shown in FIG. 13.

A description will now be given of step S215. Step S215 handles the fifth case where XA is less than 0 and YA is less than or equal to 0, that is, the current point moves in the left direction and at least does not move in the upper direction from the previous point. When the current point moves in such a way, for instance, the user is likely to move the scope 25 counterclockwise in the left direction. At step S216, the computer 1 determines that the user intends to move the scope 25 in the left direction. Then, the computer 1 proceeds from step S217 to step S322 in FIG. 18 and then examines newly updated values XA and YA again. At step S322, if the computer 1 remains unchanged, that is, if the updated XA is less than 0 and the updated YA is less than or equal to 0, the computer 1 sets the manipulation phase to the manipulation continuation phase at step S324 and then terminates the procedure. If the computer 1 does not remain unchanged, the computer 1 proceeds to step S323 and determines whether or not the updated XA is less than 0 and the updated YA is more than 0. When this condition is satisfied, it is determined that the updated current point has moved in the upper-right direction. If the condition is satisfied at step S323, the computer 1 proceeds to step S325 and then sets the manipulation phase to the manipulation completion phase. If the condition is not satisfied at step S323, the computer 1 sets the manipulation phase to the error phase at step S326 and then terminates the procedure.

Figure 19:
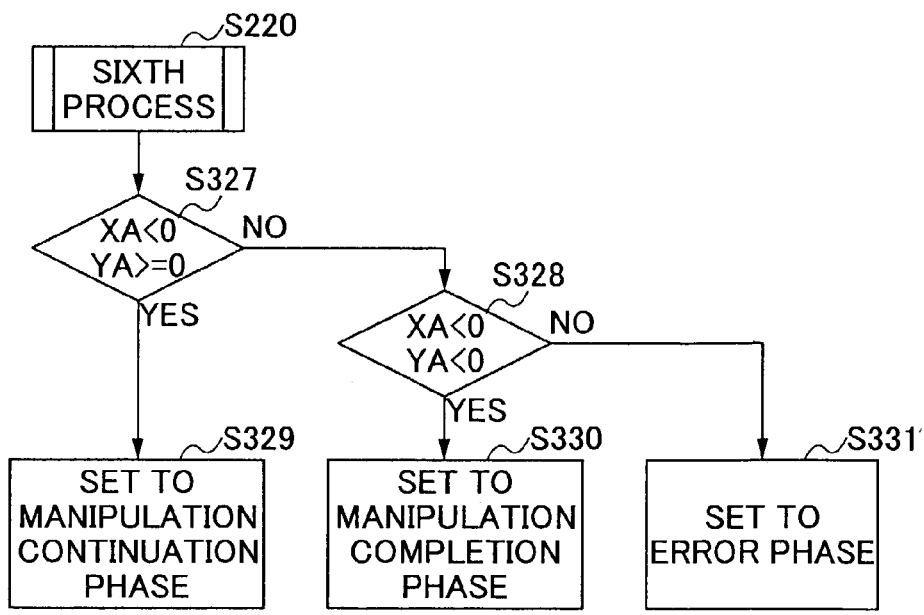
FIG. 19 is a flowchart of a sixth process in the flowchart shown in FIG. 13.

A description will now be given of step S218. Step S218 handles the sixth case where XA is less than 0 and YA is more than or equal to 0, that is, the current point moves in the left direction and at least does not move in the lower direction from the previous point. When the current point moves in such a way, for instance, the user is likely to move the scope 25 clockwise in the left direction. At step S219, the computer 1 determines that the user intends to move the scope 25 in the left direction. Then, the computer 1 proceeds from step S220 to step S327 in FIG. 19 and then examines newly updated values XA and YA again. At step S327, if the computer 1 remains unchanged, that is, if the updated XA is less than 0 and the updated YA is more than or equal to 0, the computer 1 sets the manipulation phase to the manipulation continuation phase at step S329 and then terminates the procedure. If the computer 1 does not remain unchanged, the computer 1 proceeds to step S328 and determines whether or not the updated XA is less than 0 and the updated YA is less than 0. When this condition is satisfied, it is determined that the updated current point has moved in the lower-left direction. If the condition is satisfied at step S328, the computer 1 proceeds to step S330 and then sets the manipulation phase to the manipulation completion phase. If the condition is not satisfied at step S328, the computer 1 sets the manipulation phase to the error phase at step S331 and then terminates the procedure.

Figure 20:
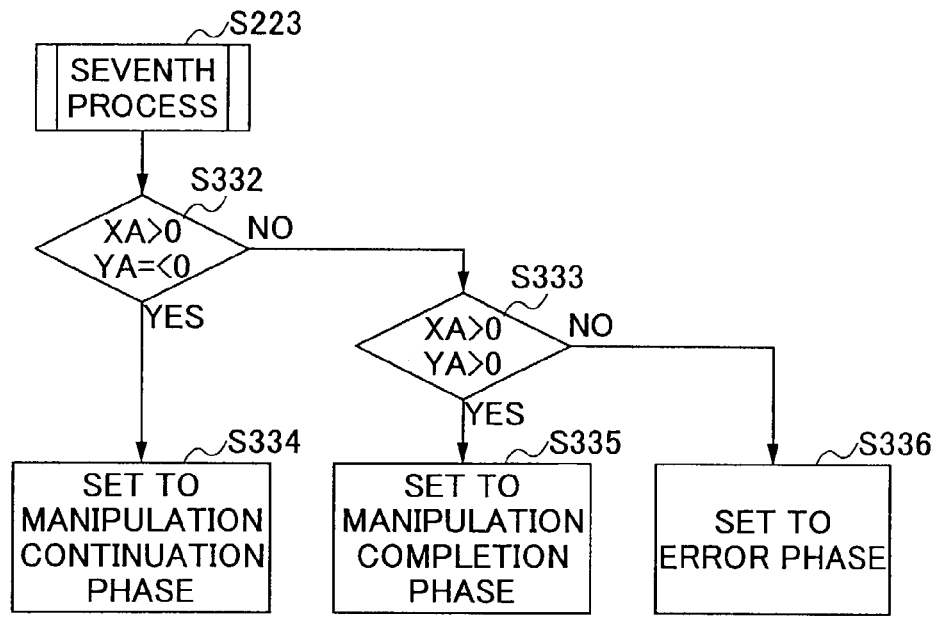
FIG. 20 is a flowchart of a seventh process in the flowchart shown in FIG. 13.

A description will now be given of step S221. Step S221 handles the seventh case where XA is more than 0 and YA is less than or equal to 0, that is, the current point moves in the right direction and at least does not move in the upper direction from the previous point. When the current point moves in such a way, for instance, the user is likely to move the scope 25 counterclockwise in the right direction. At step S222, the computer 1 determines that the user intends to move the scope 25 in the right direction. Then, the computer 1 proceeds from step S223 to step S332 in FIG. 20 and then examines newly updated values XA and YA again. At step S332, if the computer 1 remains unchanged, that is, if the updated XA is more than 0 and the updated YA is less than or equal to 0, the computer 1 sets the manipulation phase to the manipulation continuation phase at step S334 and then terminates the procedure. If the computer 1 does not remain unchanged, the computer 1 proceeds to step S333 and determines whether or not the updated XA is more than 0 and the updated YA is more than 0. When this condition is satisfied, it is determined that the updated current point has moved in the upper-right direction. If the condition is satisfied at step S333, the computer 1 proceeds to step S335 and then sets the manipulation phase to the manipulation completion phase. If the condition is not satisfied at step S333, the computer 1 sets the manipulation phase to the error phase at step S336 and then terminates the procedure.

Figure 21:
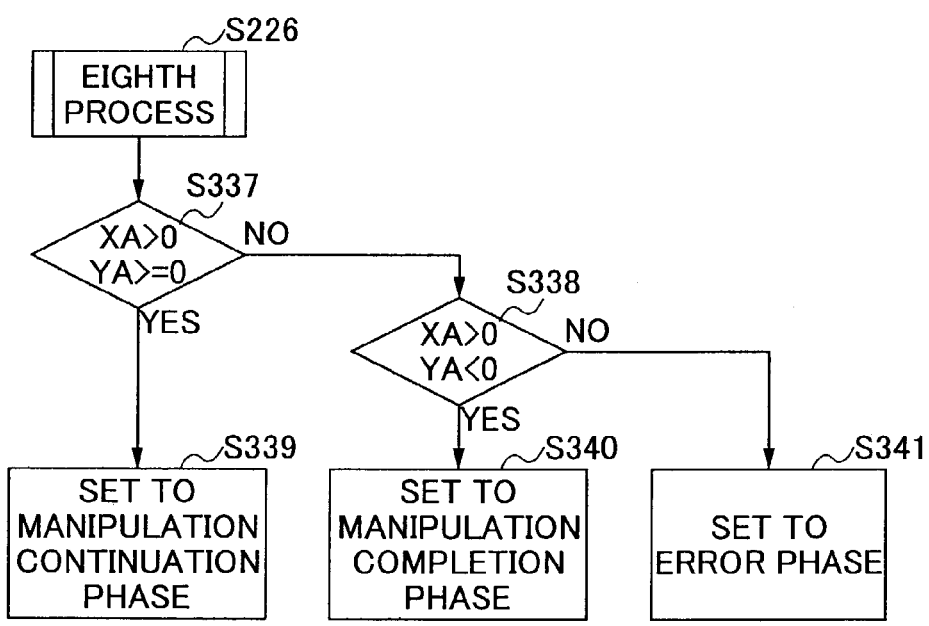
FIG. 21 is a flowchart of an eighth process in the flowchart shown in FIG. 13.

A description will now be given of step S224. Step S224 handles the eighth case where XA is more than 0 and YA is more than or equal to 0, that is, the current point moves in the right direction and at least does not move in the lower direction from the previous point. When the current point moves in such a way, for instance, the user is likely to move the scope 25 clockwise in the right direction. At step S225, the computer 1 determines that the user intends to move the scope 25 in the right direction. Then, the computer 1 proceeds from the step S226 to step S337 in FIG. 21 and then examines newly updated values XA and YA again. At step S337, if the computer 1 remains unchanged, that is, if the updated XA is more than 0 and the updated YA is more than or equal to 0, the computer 1 sets the manipulation phase to the manipulation continuation phase at step S339 and then terminates the procedure. If the computer 1 does not remain unchanged, the computer 1 proceeds to step S338 and determines whether or not the updated XA is more than 0 and the updated YA is less than 0. When this condition is satisfied, it is determined that the updated current point has moved in the upper-right direction. If the condition is satisfied at step S338, the computer 1 proceeds to step S340 and then sets the manipulation phase to the manipulation completion phase. If the condition is not satisfied at step S338, the computer 1 sets the manipulation phase to the error phase at step S341 and then terminates the procedure.

Figure 22:
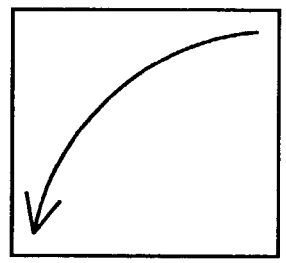
FIG. 22 is a diagram illustrating a case where an arc is drawn counterclockwise in the lower-left direction.
Figure 23:
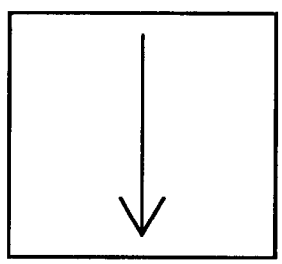
FIG. 23 is a diagram illustrating a case where a straight line is drawn in the lower direction.
Figure 24:
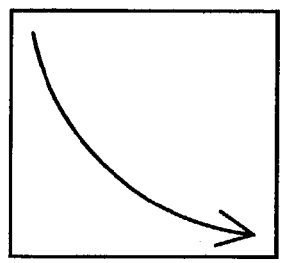
FIG. 24 is a diagram illustrating a case where an arc is drawn counterclockwise in the lower-right direction.

A description will now be given, with reference to FIGS. 22 through 24, of some examples processed in accordance with the above-mentioned flowcharts. As the first stage, XA and YA are less than 0 in FIG. 22, which corresponds to step S203 in FIG. 13. As the second stage, when the movement shifts to such a condition as FIG. 23, XA is equal to 0 and YA is less than 0 in FIG. 23, which corresponds to step S304 in accordance with the condition at step S302 in FIG. 14. As the third stage, when the movement shifts to such a condition as FIG. 24, XA is more than 0 and YA is less than 0, which corresponds to step S305 in accordance with the condition at step S303 in FIG. 14.

In this fashion, it is supposed that a touch is detected. After the first, the second and the third stages are completed, the coordinate determination process is completed as the manipulation completion phase. Then, the computer 1 discards the coordinate data used in the determination and proceeds to the next process, that is, the display character replacement process.

Figure 13:
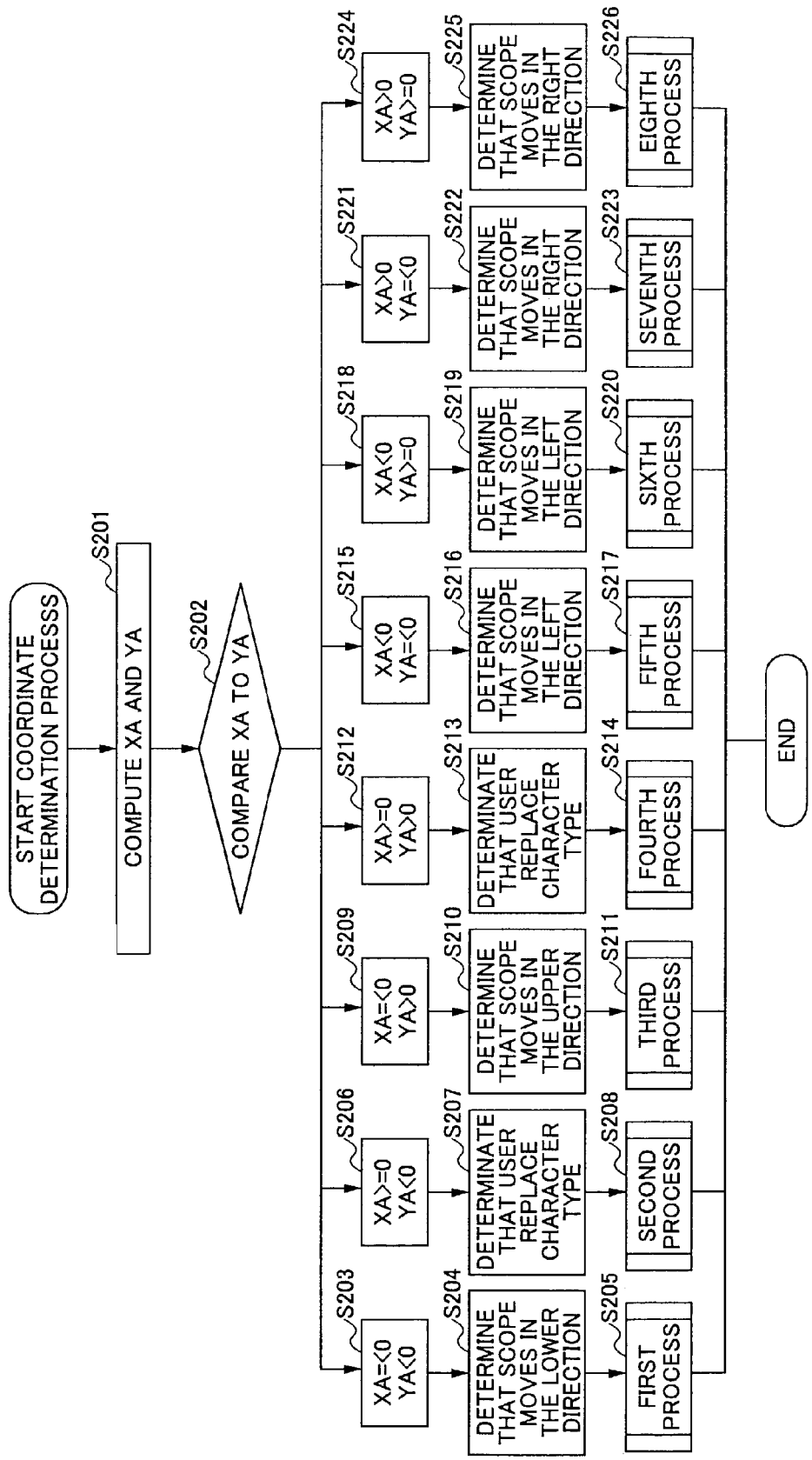
FIG. 13 is a flowchart of a coordinate determination process in the flowchart shown in FIG. 11.

Also, in the above-mentioned flowcharts, step S207 and step S213 in FIG. 13 are related to the replacement process of the character type. Here, the character type may be replaced according to the order: Hiragana character, Katakana character, Hiragana character and Katakana character in the step S207 and according to the reverse order: Katakana character, Hiragana character and Katakana character and Hiragana character in the step S213.

Furthermore, the above-mentioned user's manipulation may be customized so as to enhance user's convenience, for instance, upper directional manipulation is changed into lower directional manipulation.

The present invention is not limited to the specifically disclosed embodiments, and variations and modifications may be made without departing from the scope of the present invention.

What is claimed is:

1. An input apparatus for inputting an input item selected by a user from a plurality of two-dimensional tables, each of the two-dimensional tables including a plurality of two-dimensionally arranged candidate input items wherein only one of the plurality of candidate input items is displayed on a display screen at one time, comprising:

an indicating position detecting part detecting an indicating position on the display screen;

a candidate input item replacing part replacing a currently displayed input item with a target input item to be displayed; and an input item determining part determining the target input item by conducting a coordinate determination operation based on combinations of whether vertical and/or horizontal shift amounts between a start indicating position and an end indicating position detected by the indicating position detecting part are non-negative and/or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end indicating position, and if the coordinate determination operation determines that the manipulation stage is in the manipulation completion phase or the error phase, the coordinate determination operation clears the stored coordinate data of the end indicating position.

2. The input apparatus as claimed in claim 1, wherein said candidate input item replacing part replaces said currently displayed input item when said indicating position is shifted along a rough circle.

3. The input apparatus as claimed in claim 1, wherein said input item is a character.

4. The input apparatus as claimed in claim 1, wherein said input item is for starting an application.

5. An input method for implementing an input apparatus for inputting an input item selected by a user from a plurality of two-dimensional tables, each of the two-dimensional tables including a plurality of two-dimensionally arranged candidate input items wherein only one of the plurality of candidate input items is displayed on a display screen at one time, the method comprising:

detecting an indicating position on the display screen;

replacing a currently displayed input item with a target input item to be displayed; and determining the target input item by conducting a coordinate determination operation based on combinations of whether vertical and/or horizontal shift amounts between a start indicating position and an end indicating position detected at the detecting step are non-negative or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end indicating position, and if the coordinate determination operation determines that the manipulation stage is in the manipulation completion phase or the error phase, the coordinate determination operation clears the stored coordinate data of the end indicating position.

6. A computer readable recording medium for recording an input program for inputting an input item selected by a user from a plurality of two-dimensional tables, each of the two-dimensional tables including a plurality of two-dimensionally arranged candidate input items wherein only one of the plurality of candidate input items is displayed on a display screen at one time, by:

detecting an indicating position on the display screen;

replacing a currently displayed input item with a target input item to be displayed; and determining the target input item by conducting a coordinate determination operation based on combinations of whether vertical and/or horizontal shift amounts between a start indicating position and an end indicating position detected at the detecting step are non-negative or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end indicating position, and if the coordinate determination operation determines that the manipulation stage is in the manipulation completion phase or the error phase, the coordinate determination operation clears the stored coordinate data of the end indicating position.

7. An input apparatus inputting a sequence of characters by sequentially selecting each character by using a pointer manipulated by a user, wherein only one of the characters, selected from a plurality of two-dimensional tables, each of the two-dimensional tables including a plurality of two-dimensionally arranged candidate characters, is displayed on a display apparatus at one time and the plurality of candidate characters are arranged in a form of a user-recognized character array, comprising:

a pointer movement detection part detecting movement of the pointer manipulated by the user;

a scoped character replacement part replacing a currently displayed character with another character of the plurality of candidate characters; and a scoped character determination part determining a scoped character as an input character by conducting a coordinate determination operation based on combinations of whether vertical and/or horizontal shift amounts between a start position and an end position of the pointer detected by the pointer movement detection part are non-negative or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end position, and if the coordinate determination operation determines that the manipulation stage is in the manipulation completion phase or the error phase, the coordinate determination operation clears the stored coordinate data of the end position.

8. The input apparatus as claimed in claim 7, wherein the display apparatus further displays a number of additional marks for punctuation and derivative marks at one time.

9. The input apparatus as claimed in claim 7, wherein the user knows the arrangement of the user-recognized character array in advance.

10. An input system for inputting a sequence of characters by sequentially selecting each character from a plurality of two-dimensional tables, each of the two-dimensional tables including a plurality of two-dimensionally arranged candidate characters, comprising:

a memory storing the plurality of candidate characters arranged in a form of a user-recognized character array;

a display apparatus displaying only one of the plurality of characters at one time;

a pointer pointing a position on a screen of the display apparatus;

an input apparatus sequentially inputting a single character displayed in the screen of the display apparatus using the pointer, including a pointer movement detection part detecting movement of the pointer manipulated by a user;

a scoped character replacement part replacing a currently displayed character with another character of the plurality of candidate characters; and a scoped character determination part determining a scoped character as an input character by conducting a coordinate determination operation based on combinations of whether vertical and/or horizontal shift amounts between a start position and an end position of the pointer detected by the pointer movement detection part are non-negative or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end position, and if the coordinate determination operation determines that the manipulation stage is in the manipulation completion phase or the error phase, the coordinate determination operation clears the stored coordinate data of the end position.

11. An input method inputting an input item selected by a user from a plurality of two-dimensional tables, each of the two-dimensional tables including a plurality of two-dimensionally arranged possible input items wherein only one of the plurality of possible input items is displayed on a display screen at one time, comprising:

detecting a position on the display screen, the position detected by a movement in at least one of three directions;

replacing a currently displayed input item based on a shift of said position; and determining the currently displayed input item by conducting a coordinate determination operation based on combinations of whether vertical and/or horizontal shift amounts between a start indicating position and an end indicating position detected are non-negative or non-positive, wherein the coordinate determination operation determines a movement direction of the position and one of the plurality of two-dimensional tables based on a first combination of whether the vertical and/or horizontal shift amounts are non-negative or non-positive and further determines a manipulation stage of the user based on a second combination of whether the vertical and/or horizontal shift amounts are non-negative or non-positive, and wherein the manipulation stage includes a manipulation continuation phase, a manipulation completion phase and an error phase, and wherein if the coordinate determination operation determines that the manipulation stage is in the manipulation continuation phase, the coordinate determination operation stores coordinate data of the end indicating position, and if the coordinate determination operation determines that the manipulation stage is in the manipulation completion phase or the error phase, the coordinate determination operation clears the stored coordinate data of the end indicating position.

12. A method, comprising:

detecting a direction of a mark where the mark can be in any direction;

moving an indicator in a two-dimensional character table responsive to the direction; and displaying one of the characters from the table responsive to a position of the indicator in a single character display.

\* \* \* \* \*